May 7, 1929. L. G. COPEMAN 1,711,721
METHOD AND APPARATUS FOR FORMING AND MAINTAINING
SANITATION IN ICE CREAM CABINETS
Filed Feb. 9, 1927
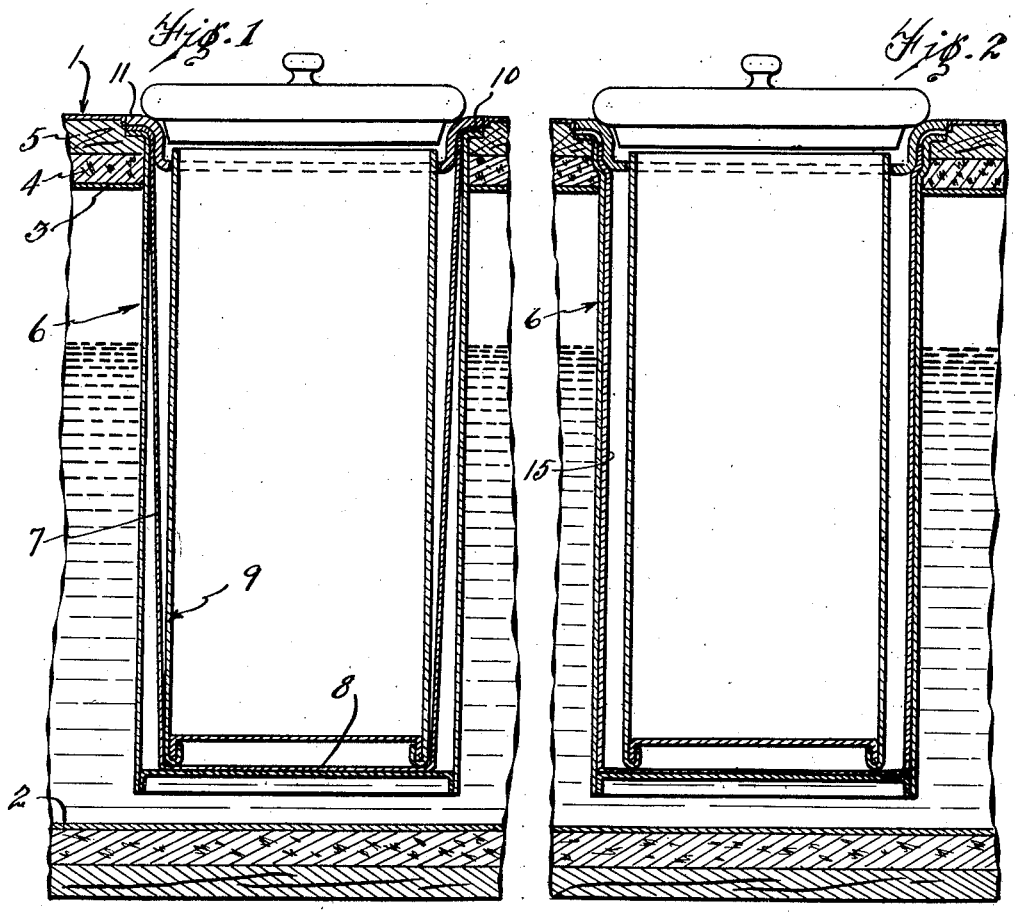
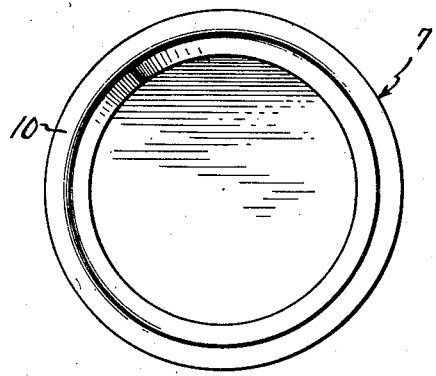
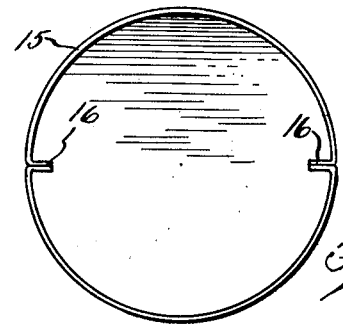
Inventor
LLOYD G. COPEMAN
By Stuart C. Barnes
Attorney Patented May 7, 1929.

1,711,721

UNITED STATES PATENT OFFICE.

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN.

METHOD AND APPARATUS FOR FORMING AND MAINTAINING SANITATION IN ICE-CREAM CABINETS.

Application filed February 9, 1927. Serial No. 166,906.

This invention relates to a method and apparatus for forming and maintaining sanitation in ice cream cabinets, and has to do particularly with ice cream cabinets of the type utilizing brine as the refrigerating medium, or as a holdover and conducting medium interposed between the refrigerating medium and the ice cream containers or receptacles.

Heretofore in the manufacture of ice cream cabinets or the like utilizing brine as the transmitting or cooling medium it has been the practice to provide suitable receptacles or containers which have usually been formed of copper, or from similar material, and to insert the ice cream cans within such copper receptacles whereby the contents of the ice cream cans have been maintained at the desired temperature. While such structures of the prior art have been more or less efficient in maintaining the proper temperature of the contents in the ice cream cans they have nevertheless presented many serious problems, particularly in the matter of sanitation. The ice cream cans, when removed from the delivery container, usually have a considerable amount of brine on the outside surface thereof, and this brine goes into the copper or other receptacle in the ice cream cabinet and remains in the space between the ice cream can and the storage receptacle. In addition, ice cream and other particles and substances are dropped in between the space between the ice cream can and the container with the result that within a very short time the inside of the copper or other container unit is corroded and presents a very unsanitary surface. Furthermore, much difficulty has been experienced in the formation of ice between the walls of the storage container and the ice cream container, with the result that it is sometimes impossible to at first remove the ice cream can from the storage container, in which case it has been the general practice to use picks and other means to remove the ice and to forcibly remove the ice cream cans. This has frequently resulted in puncturing of the storage containers with the result that it has been necessary to remove the storage container or containers and disassemble the entire cabinet.

It is the object of the present invention to overcome these many difficulties by providing a paper receptacle to be positioned between the storage container and the ice cream can, and which paper receptacle is preferably in sealed air-tight contact with the upper end of the storage container with the result that all circulation of air past the inside surface of the storage container is stopped thus materially preventing the formation of any ice between the walls of the storage container and the ice cream can. This paper receptacle may be inserted with each ice cream can so that all brine and other corrosion forming substances are caught between the receptacle and ice cream can, with the result that they do not come in contact with the metal storage container, and with the further result that such substances and particles are removed with the removal of the ice cream can, thus keeping the storage compartment container in a sanitary condition at all times. It might be stated that it is practically impossible to clean the storage container while the cabinet is in operation for the reason of the extreme cold in the bottom part of the compartment and the freezing of the cleaning substance, or rag, in attempting to clean such inside surfaces.

In the drawings:

Fig. 1 is a fragmentary vertical sectional view showing the preferred manner of inserting a paper receptacle within the metal storage container of an ice cream cabinet, the paper receptacle being shown tapered to permit stacking.

Fig. 2 is a vertical sectional view similar to Fig. 1 showing a modified manner of insuring sanitation in that the paper receptacle is uniformly cylindrical and may be collapsible or foldable.

Fig. 3 is a plan view of the tapered paper receptacle shown in Fig. 1.

Fig. 4 is a plan view of the receptacle utilized in Fig. 2 showing the preferred manner of forming the walls of the same to permit folding.

In illustrating the present invention I have confined the figures in the drawings to a more or less diagrammatic showing of a single storage compartment forming a part of a standard ice cream cabinet of the type utilizing mechanical refrigeration wherein the tank is filled with brine which serves as a conducting medium between the direct expansion unit, or units, and the storage containers. The ice cream cabinet may be generally designated 1 and preferably consists of a tank 2 for receiving the refrigerating medium and the brine. The tank 2 may be formed of bottom and sides only, or may be formed with a top portion 3. In either case, the top part of the ice cream cabinet is preferably provided with a suitable insulating medium 4 and a top 5.

Suitable apertures are provided in the top of the tank in the ice cream cabinet for receiving the storage compartment container. These storage compartment containers may be generally designated 6. They are usually cylindrical in shape, closed at the bottom and welded or otherwise permanently secured at the top to the metal cover of the cabinet, or to the metal top 3 of the tank. In the present construction I preferably adjustably maintain the containers 6 in position by having them removably connected with the ice cream cabinet, but as far as the present invention is concerned it is immaterial whether such storage compartment containers are separately removable or welded to the tank or cabinet.

As shown in Fig. 1, I preferably provide a paper receptacle 7 which is slightly conical in shape and closed at the bottom, as at 8. This receptacle 7 is preferably of waxed paper but it will be understood that the material of such receptacle may vary within wide limits. The bottom part of the receptacle 7 is preferably of as small a diameter as possible consistent with the ice cream can, which may be designated 9. The top part of the receptacle 7 is preferably formed of a diameter so as to have a very close fit with the top part of the cylindrical containers 6.

The top part of the paper receptacle 7 is preferably formed with a suitable flange 10 so as to fit over the top part of the container 6 and in order to get the best results I preferably provide a suitable ring or expanding member 11 which may be formed in any manner desired as long as it effects and maintains a tight seal or fit between the top of the receptacle 7 and the top of the container 6.

The receptacle 7 is preferably air tight as far as the sides and bottom are concerned, with the result that when an ice cream can is placed within the paper receptacle and the can and receptacle placed in the main container 6, the top part of the receptacle of largest diameter contacts with the top part of the container 6 so as to form a tight joint to seal the space between the bottom part of the receptacle 7 and the bottom part of the container 6. The ring 11 will materially assist in maintaining this tight joint and thus exclude all air from entering between the receptacle 7 and the outside container 6. By excluding the air from such space it will be obvious that the formation of frost and ice will be materially reduced with the result that the ice cream cans will be readily removed at any time desired. It will furthermore be obvious that the inside walls of the main container 6 will be maintained in a sanitary condition at all times as all brine and other substances or particles are positively prevented from entering the space between the receptacle 7 and the container 6. Furthermore, it will be obvious that any ice cream or other particles which may accidently fall outside the ice cream can 9 will be caught by the receptacle 7 and be removed from the cabinet when the particular ice cream can is removed.

The modification shown in Fig. 2 is essentially the same as shown in Fig. 1, with the exception that the receptacle, which may be designated 15, is cylindrical and of preferably uniform diameter. This receptacle accomplishes practically the same results as the receptacle shown in Fig. 1 as it materially prevents the formation of frost between the ice cream can and the receptacle. Furthermore, it permits the receptacle to be folded. Such receptacle 15 may be secured together by providing suitable joints 16, as shown in Fig. 4, whereby the receptacle may be folded and easily carried at all times, and the bottom may be folded in a manner similar to the folding of a paper bag, whereas the receptacles shown in Figs. 1 and 3 are preferably stacked.

It will thus be seen that I have provided a novel method of insuring sanitation in ice cream or similar cabinets whereby the main and practically permanent storage containers may be maintained in a sanitary condition at all times and whereby all refuse and waste is removed at each removal of the ice cream can.

It will be understood that the receptacles 7 and 15 may be of various designs and may be formed of various materials but they are preferably of a design to be easily inserted in the storage containers, and preferably air tight so as to exclude the air from adjacent the surface of the storage container. It will also be understood that such receptacles 7 and 15 may be formed of cloth or other substances which may be removed with the cans and washed or cleaned and used again.

What I claim is:

1. The method of insuring and maintaining sanitation in ice cream cabinets and similar units of the type having a permanent outside container in heat conducting relation with the cooling medium, and a removable inside container for carrying the substance to be cooled, which comprises sealing the outside surface of the inner container from the inside surface of the outside container.

2. The method of insuring and maintaining sanitation in ice cream cabinets and similar units of the type having a permanent outside container in heat conducting relation with the cooling medium, and a removable inside container for carrying the substance to be cooled, which comprises providing a space adjacent the walls of the inner container and sealing said space from the walls of the outer container.

3. The method of insuring and maintaining sanitation and of preventing the formation of ice between the inner and outer containers in ice cream cabinets and similar units of the type having a permanent outside container in heat conducting relation with the cooling medium, and a removable inside container for carrying the substance to be cooled, which comprises interposing a medium between the inner and outer containers to prevent the formation of frost or ice between the two containers.

4. An ice cream cabinet comprising one or more compartment containers surrounded by a cooling medium and adapted to receive ice cream cans or similar articles, a receptacle inserted between the can and the outer container for preventing any brine or other unsanitary substances upon the outside surface of the ice cream can from coming in contact with the outer container.

5. An ice cream cabinet comprising one or more compartment containers adapted to receive ice cream cans or similar articles, a receptacle inserted in the compartment container between the ice cream can and said container and adapted to have a portion thereof in contact with the compartment container, whereby it may be removed with the ice cream can to keep the compartment container in a sanitary condition.

6. An ice cream cabinet comprising one or more compartment containers adapted to receive ice cream cans or similar articles, a receptacle inserted in the compartment container between the ice cream can and said container and adapted to have a portion thereof in contact with the compartment container, whereby it may be removed with the ice cream can to keep the compartment container in a sanitary condition, said point of contact between the receptacle and the compartment container being such as to exclude outside air from coming in contact with the inner walls of the compartment container and thus materially reducing the formation of frost.

7. Ice cream cabinets, or similar structures of the type having an outside compartment container for holding an inside container which contains articles to be cooled, comprising in combination a receptacle positioned between the two containers and having a portion at the top thereof in substantially air-tight relation with the top portion of the outside container, whereby to materially prevent the circulation of air against the inner surface of said outside container and thus prevent the formation of frost or ice between the two said containers.

8. Ice cream cabinets, or similar structures of the type comprising a cabinet adapted to hold a cooling medium and having a compartment for holding an inside container for containing articles or substances to be cooled, in combination with a tapered paper receptacle for receiving said inside container and for separating said two containers, the top part of said tapered receptacle being approximately of the diameter of the outside container.

9. The method of keeping the space between an inner and outer container of an ice cream cabinet, having an outer container in contact with a cooling medium and an inner container carrying substance to be cooled, free from ice and other substances which comprises the placing of a receptacle between the inner and outer container, and the placing of a sealing ring upon the upper end of the receptacle to form a substantially air-tight seal between the upper end of the receptacle and the top of the outside container.

In testimony whereof I affix my signature.

LLOYD G. COPEMAN.